United States Patent Office 3,666,543
Patented May 30, 1972

3,666,543
TRIS-(2-HYDROXYALKYL)-PHOSPHINE OXIDE
FLAME RETARDANT ARTICLES
Ludwig Maier, 17 Tiergartenstrasse,
8802 Kilchberg, Zurich Switzerland
No Drawing. Filed Nov. 18, 1970, Ser. No. 90,787
Claims priority, application Switzerland, Nov. 24, 1969,
17,554/69; Aug. 31, 1970, 12,973/70
Int. Cl. C09d 5/18; D06m 13/28; B32b 27/18
U.S. Cl. 117—136                                 3 Claims

ABSTRACT OF THE DISCLOSURE

Tris-(2-hydroxyalkyl)-phosphine oxides of the formula $$(RCHCH_2)_3PO$$
$$\phantom{(RCHCH_2)_3}|$$
$$\phantom{(RCHCH_2)_3}OH$$

in which R signifies an alkyl group having 1 to 6 carbon atoms and having 0–6 halogen substituents are provided. A process for preparing these phosphine oxides and the use thereof as flameproofing agents are disclosed.

BACKGROUND OF THE INVENTION

It is known that tris-(hydroxymethyl)-phosphine oxide is formed as a principal product upon treatment of tetrakis-(hydroxymethyl)-phosphonium chloride with sodium hydroxide solution. However, that process is not suited for the preparation of the novel compounds herein, e.g., tris-(3-chloro-2-hydroxypropyl)-phosphine.

In accordance with the present invention, tris-(2-hydroxyalkyl)-phosphine oxides, a novel class of chemical compounds, are prepared. This is accomplished by treating an aqueous solution of a tris-(2-hydroxyalkyl)-hydroxymethylphosphonium chloride of the formula $$[(RCHCH_2)_3PCH_2OH]^+ \; Cl^-$$
$$\phantom{[(RCHCH_2)_3}|$$
$$\phantom{[(RCHCH_2)_3}OH$$

with at least twice a molar amount of chlorine at a temperature of from 15 to 50° C. and at a pH in the range of 1 to 7. When the novel phosphine oxides are applied to combustible products the flame resistance thereof is increased.

DETAILED DESCRIPTION

The tris-(2-hydroxyalkyl)-hydroxymethylphosphonium chlorides serving as starting compounds in the present invention may be prepared by reacting tetrakis-(hydroxymethyl)-phosphonium chloride with a corresponding 1,2-alkylene oxide, e.g., α-epihalohydrin, using a molar ratio of 1:3 in aqueous solution at a pH of from about 8 to 9 and a preferred temperature of from about 15 to 30° C. The solution is neutralized and concentrated by evaporation for the isolation of the product. The product may be etxracted with, e.g., ethyl alcohol. However, for the preparation of the desired tris-(2 - hydroxyalkyl)-phosphine oxide, the aqueous solution after having been at least neutralized, may also directly be treated with chlorine. The chlorine is introduced expediently at room temperature. A higher temperature than about 50° C. is not desirable. The tris-(2 - hydroxyalkyl)-phosphine oxides, especially tris-(3-chloro-2-hydroxypropyl)-phosphine oxide and tris-(3-bromo-2-hydroxypropyl)-phosphine oxide are excellent flameproofing agents for combustible materials like polyesters, polyurethanes, polyamides, polyhydrocarbons, cellulose, cellulose derivatives, paper and wood. The compound may be added to, for example, the spinning dopes or melts to be extruded, or textiles, paper, wood and the like may be impregnated with a solution. When compared with phosphine oxides having hydroxymethyl groups such as tris-(hydroxymethyl)-phosphine oxide, the compounds of invention possess a greater thermal stability in that they do not release toxic formaldehyde upon heating to the temperature at which tris - (hydroxymethyl)-phosphine oxide releases formaldehyde. Likewise upon stronger heating and comparing at the same higher temperature, no easily volatile and very toxic phosphine is formed. The compounds of this invention also show advantages over the solid tris-(chloromethyl)-phosphine oxide (M.P. 99–100° C.), in that they are surprisingly liquid and naturally much less volatile and, moreover, display better solubility in organic solvents. Textile fibers made flameproof with same are less brittle. The halogenated products like tris-(3-halo-2-hydroxypropyl)-phosphine oxide possess the advantages of the formerly used hydroxylated or halogenated trimethylphosphine oxides without their disadvantages, owing to the simultaneous presence of hydroxy groups and halogen atoms in the same molecule.

The novel phosphine oxide compounds further are useful as platsicizers. They can be used instead of well known plasticizers which later may be replaced totally or partially. Conventional methods can be used to incorporate the compounds into polymers. In general, the amount of phosphine oxide compound added to the base combustible material will range from 0.5 to 20 weight percent. The novel phosphine oxide compounds also are valuable intermediates. The hydrogen atom of the hydroxyl group is exchangeable in the same manner as that of ordinary alcohols. With acid chlorides such as, e.g., acetyl chloride, benzoyl chloride etc., the corresponding ester derivatives of the tertiary phosphine oxides having the formula $$(ClCH_2CHCH_2)_3PO$$
$$\phantom{(ClCH_2CHCH_2)_3P}|$$
$$\phantom{(ClCH_2CHCH_2)_3P}O$$
$$\phantom{(ClCH_2CHCH_2)_3P}|$$
$$\phantom{(ClCH_2CHCH_2)_3P}COR''$$

in which R'' signifies a corresponding organic group, can be obtained employing well known methods. The halogen atom possibly present in the hydroxyalkyl group can be replaced in usual manner. By reacting with an alcohol, phenol or mercaptan in form of their alkali salts or in the presence of a tertiary base such as, e.g., triethylamine, using common methods, however temperatures not higher than about 100° C., the corresponding ether derivatives of the tertiary phosphine oxides having the formulae $$(R'OCH_2CHCH_2)_3PO \text{ and } (R'SCH_2CHCH_2)_3PO$$
$$\phantom{(R'OCH_2CHCH_2)_3}|\phantom{PO \text{ and } (R'SCH_2CHCH_2)_3}|$$
$$\phantom{(R'OCH_2CHCH_2)_3}OH\phantom{PO \text{ and } (R'SCH_2CHCH_2)_3}OH$$

in which R'' is derived from the reactant substituting the chlorine atom, can be obtained. In such a halogen exchange it is known that the alcohols, phenols and mercaptans used may also have inert substituents such as, e.g., tertiary amino, acyl, ether, ester groups and halogen atoms. It will be perceived that both the above described reactions possibly may be combined. The resulting compounds showing an ether or thioether group also are valuable plasticizers. The thermally more stable aromatic derivatives are also useful as hydraulic fluids and lubricants. The ester derivatives may find similar usage as the ethers.

The following examples are illustrative of the invention.

EXAMPLE I

To a solution containing 33.5 g. (0.0886 mol) of tris-(3-chloro - 2 - hydroxypropyl)-phosphonium chloride in 170 ml. of water HCl (1:1) was added by drops to reduce the pH of the solution to 1. Then, 13.8 g. of chlorine were led into the reaction vessel at 20° C. The pH was kept at about 1 by addition of requisite amounts of sodium hydroxide solution. When the introduction of chlorine gas was completed, the solution was neutralized and evaporated to dryness. The residue of the evaporation was dissolved in ethyl alcohol, the precipitated NaCl filtered off, the filtrate concentrated by evaporation, the residue dissolved in water, and the solution passed through a cation exchanger (DOWEX 50 Na+). Upon evaporation the residue was dried at 80° C. in vacuo. Nineteen grams (65.5% yield) of tris-(3-chloro-2-hydroxypropyl)-phosphine oxide, yellowish oil were produced.

The resulting product was analyzed by high resolution nuclear magnetic resonance spectroscopy. By this analytical technique the chemical structure of tris-(3-chloro-2-hydroxypropyl)-phosphine oxide was confirmed.

The phosphonium chloride starting compound was obtained as follows:

A solution of 19.0 grams (0.1 mol) of $(HOCH_2)_4PCl$ in 10 ml. of water was brought to a pH of 8.3 by addition of 5 N-potassium hydroxide solution, and then 27.7 grams (0.3 mol) of α-epichlorohydrin (1-chloro-2,3-epoxypropane) were added by drops. The temperature was kept at about 20 to 30° C. by cooling with ice and the pH was maintained between 8 and 9 by addition of hydrochloric acid (1:1) as required. After the mixture had been allowed to stand for 18 hours, the solution was concentrated by evaporation; the residue of evaporation dissolved in ethyl alcohol, the separated KCl filtered off and the filtrate completely concentrated and dried at 80° C. in vacuo.

Thirty-seven grams (97.9% yield) of

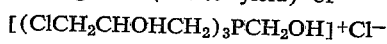

a highly viscous slightly yellowish oil were produced.

The resulting product was analyzed by high resolution nuclear magnetic resonance spectroscopy. By the analytical technique the chemical structure of tris-(3-chloro-2-hydroxypropyl)-hydroxymethylphosphonium chloride was confirmed.

EXAMPLE II

Into a solution of 11.1 grams (0.404 mol) of tris-(2-hydroxypropyl)-hydroxymethylphosphonium chloride in 50 ml. of water were brought 6.3 grams (0.89 mol) of chlorine. The pH of the solution was maintained between 4 to 7. The mixture reacted and the product separated as described in Example I.

Eight and one-half grams (93.6%) of tris-(2-hydroxypropyl)-phosphine oxide, a colorless, viscous liquid, were produced.

The resulting product was analyzed by high resolution nuclear magnetic resonance spectroscopy. By this analytical technique the chemical structure of the phosphine oxide was confirmed.

The starting compound was prepared as follows:

From 190.5 grams (1 mol) of tetrakis-(hydroxymethyl)-phosphonium chloride in 150 ml. of water, 53 grams KOH in 150 ml. of water and 191 grams (3.3 mols) of propylene oxide, there were obtained in a manner similar to that described in the foregoing example 247 grams (90.1%) tris - (2 - hydroxypropyl)-hydroxymethylphosphonium chloride, a colorless, viscous oil.

I claim:

1. A normally combustible article rendered flame retardant by having combined therewith a small but effective amount of a tris-(2-hydroxyalkyl)-phosphine oxide of the formula

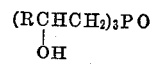

is which R is an alkyl group having 1 to 6 carbon atoms and 0–6 halogen substituents.

2. A textile article rendered flame retardant by having combined therewith a small but effective amount of tris-(2-hydroxypropyl)-phosphine oxide.

3. A textile article rendered flame retardant by having combined therewith a small but effective amount of tris-(3-chloro-2-hydroxypropyl)-phosphine oxide.

References Cited

UNITED STATES PATENTS

| | | | |
|---|---|---|---|
| 3,404,187 | 10/1968 | Kober et al. | 260—606.5 |
| 3,477,953 | 11/1969 | Carlson | 260—606.5 X |
| 2,911,325 | 11/1959 | Drake et al. | 117—136 |
| 3,501,556 | 3/1970 | Weil et al. | 106—15 X |
| 3,248,429 | 4/1966 | Baranauckas | 252—8.1 X |

WILLIAM D. MARTIN, Primary Examiner

H. J. GWINNELL, Assistant Examiner

U.S. Cl. X.R.

117—138.8 F, N, D, UA, 143 R, 147, 154; 252—8.1, 260—606.5 P